United States Patent
Hara et al.

(10) Patent No.: US 11,286,030 B2
(45) Date of Patent: Mar. 29, 2022

(54) AIRCRAFT, TAIL CONE, AND FUSELAGE OF AIRCRAFT

(71) Applicant: MITSUBISHI AIRCRAFT CORPORATION, Aichi (JP)

(72) Inventors: Nobuhide Hara, Tokyo (JP); Takuo Oda, Tokyo (JP); Osamu Yamada, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 620 days.

(21) Appl. No.: 15/431,960

(22) Filed: Feb. 14, 2017

(65) Prior Publication Data

US 2017/0247099 A1 Aug. 31, 2017

(30) Foreign Application Priority Data

Feb. 29, 2016 (JP) .............................. JP2016-037863

(51) Int. Cl.
*B64C 1/10* (2006.01)
*B64C 1/40* (2006.01)
*B64C 5/02* (2006.01)

(52) U.S. Cl.
CPC ................. *B64C 1/10* (2013.01); *B64C 1/40* (2013.01); *B64C 5/02* (2013.01)

(58) Field of Classification Search
CPC ..................................... B64C 1/10; B64C 1/40
See application file for complete search history.

(56) References Cited

U.S. PATENT DOCUMENTS

| | | | | |
|---|---|---|---|---|
| 4,425,980 A | * | 1/1984 | Miles | B64C 1/40 181/208 |
| 4,998,598 A | * | 3/1991 | Mardian | E06B 5/20 181/284 |
| 6,868,940 B1 | * | 3/2005 | Mekwinski | E01F 8/007 181/284 |
| RE39,972 E | * | 1/2008 | Royalty | 181/212 |
| 7,690,161 B2 | * | 4/2010 | McPherson | B62D 27/065 52/208 |
| 8,042,768 B2 | * | 10/2011 | Liguore | B29C 70/088 244/119 |
| 9,016,628 B2 | * | 4/2015 | Christenson | B64C 1/064 244/119 |
| 2007/0272482 A1 | * | 11/2007 | Yamaguchi | G10K 11/172 181/290 |

(Continued)

FOREIGN PATENT DOCUMENTS

JP 2000516553 A 12/2000
WO 98/05553 A1 2/1998

*Primary Examiner* — Richard R. Green
(74) *Attorney, Agent, or Firm* — Pearne & Gordon LLP

(57) ABSTRACT

To prevent overheating of a structural member such as a pivot bulkhead facing a rear side of a fire wall to maintain the temperature of the structural member at allowable temperature or lower. An aircraft of the present invention includes: a fire wall resistant to flame; a structural member facing a rear side of the fire wall; and a skin surrounding the fire wall and the structural member. The structural member includes a guide member and a heat shielding member. The structural member guides, upward, air existing on the rear side of the fire wall, and the heat shielding member shields the guide member from heat radiated by the fire wall.

12 Claims, 10 Drawing Sheets

(56) References Cited

U.S. PATENT DOCUMENTS

| | | | |
|---|---|---|---|
| 2008/0099611 A1* | 5/2008 | Martino Gonzalez | ........................ B64D 29/08 244/119 |
| 2010/0101891 A1* | 4/2010 | Kamikawa | .............. B32B 15/18 181/290 |
| 2010/0206987 A1* | 8/2010 | Haack | ........................ B64C 1/40 244/121 |
| 2014/0345991 A1* | 11/2014 | Zywiak | .................. B64C 25/42 188/264 R |

* cited by examiner

AIRCRAFT, TAIL CONE, AND FUSELAGE OF AIRCRAFT

BACKGROUND OF THE INVENTION

Field of the Invention

The present invention relates to a technology of preventing overheating of a structural member that faces a back side of a fire wall. The fire wall is resistant to flame occurring from an auxiliary power unit or other unit of an aircraft.

Description of the Related Art

An auxiliary power unit (APU) is provided on an end of a rear fuselage of an aircraft, and the auxiliary power unit and an inside of the rear fuselage are separated by a pivot bulkhead. A fire wall is disposed between the auxiliary power unit and the pivot bulkhead (see JP2000-516553 A).

If a fire occurs from the auxiliary power unit, the temperature of air in a space between the fire wall and the pivot bulkhead that is adjacent to a rear surface of the fire wall is increased by the heat of the flame.

An object of the present invention is to prevent overheating of the structural members such as the pivot bulkhead and to maintain the temperature of the structural members at an allowable temperature or lower even in such a case.

SUMMARY OF THE INVENTION

An aircraft according to the present invention includes: a fire wall resistant to flame; a structural member facing a rear side of the fire wall; and a skin surrounding the fire wall and the structural member. The structural member includes a guide member and a heat shielding member, the guide member guiding, upward, air existing on the rear side of the fire wall, and the heat shielding member shielding the guide member from heat radiated by the fire wall.

When fire occurs, the guide member of the structural member is shielded by the heat shielding member from radiant heat that is radiated from the fire wall toward the structural member on the rear side. This results in temperature difference between the rear side (the guide member) of the heat shielding member and the space the temperature of which is increased by the radiant heat. The air in the space between the fire wall and the structural member is guided upward by the guide member through the chimney effect based on density difference corresponding to the temperature difference. The heat of the air is dissipated to the outside of the space through contact with the skin while the air is circulated in the space. The air in the space is cooled by the skin that faces the outside air, thereby continuously dissipating heat to the outside of the space. This makes it possible to prevent overheating in the space. As a result, the heat shielding member that is brought into contact with the air in the space continuously shields the structural member from the radiant heat without being damaged. This makes it possible to maintain the temperature of the structural member at allowable temperature or lower when fire occurs.

According to the present invention, it is possible to maintain the temperature of the structural member at allowable temperature or lower for a long time that exceeds a time during which the temperature of the structural member is maintained at allowable temperature or lower in a case where a heat insulation material is used to suppress increase of the temperature of the structural member due to heat radiated from the fire wall.

In the aircraft according to the present invention, a flow path through which the air flows may be preferably provided between the guide member and the heat shielding member.

When the flow path is provided between the guide member and the heat shielding member, an upward flow of convection in the space between the fire wall and the structural member is more sufficiently guided along the guide member. This makes it possible to continuously and stably generate the flow of the air that circulates in the space.

In other words, the flow path provided between the guide member and the heat shielding member makes it possible to enhance effect of dissipating heat of the air in the space.

In the aircraft according to the present invention, the structural member may preferably include a coupling member supporting a horizontal tail, and the coupling member may preferably function as the guide member.

The coupling member extending in the vertical direction also functions as the guide member in the present invention.

In the aircraft according to the present invention, the heat shielding member may preferably extend to a vicinity of an inner circumferential part of the skin beyond an upper end of the coupling member.

Accordingly, since the heat shielding member projects upward from the upper end of the coupling member, the upward flow of convection is sufficiently blown to the skin along the heat shielding member. As a result, a downward flow of the convection flows near the inner circumferential part of the skin, which makes it possible to promote heat dissipation through the skin.

In the aircraft according to the present invention, the coupling member may preferably include a first flange, a second flange, and a web. The first flange may preferably face the rear surface of the fire wall, and may be preferably covered with the heat shielding member. The second flange may be preferably jointed to a surface, on the fire wall side, of the structural member. The web may preferably couple the first flange to the second flange, and may preferably form a flow path through which the air flows, between the web and the heat shielding member.

Such a coupling member makes it possible to form the flow path between the web and the heat shielding member while supporting the heat shielding member by the first flange. In addition, it is possible to shield the side surface of the web from the radiant heat.

In the aircraft according to the present invention, the flow path may be preferably provided between the heat shielding member and a surface of the web located on a center side of the fire wall.

As a result, the heat shielding member is disposed on one of both surfaces of the web that is more widely open to heat rays radiated from the fire wall, which makes it possible to sufficiently shield the coupling member.

The other side of the web partially opens air flow along the coupling member, which makes it possible to reduce pressure loss.

The aircraft according to the present invention may further include a compartment that is surrounded by the skin in front of the structural member, and the compartment may preferably include an intake passage through which outside air is taken into an upper part of the compartment, and a first exhaust passage through which air is exhausted from the compartment to outside of the compartment.

The flow of the air taken into the compartment through the intake passage is exhausted to the outside of the aircraft through the first exhaust passage in a state of conveying heat existing in the compartment while spreading in the compartment. The heat exhaust from the compartment performed in such a manner reduces temperature of atmosphere in the compartment, which makes it possible to prevent overheating of the structural member facing the compartment and to contribute to maintenance of the temperature of the structural member at allowable temperature or lower.

In the aircraft according to the present invention, the compartment may preferably include a second exhaust passage through which the air is exhausted from the upper part of the compartment near the structural member.

This makes it possible to smoothly exhaust heat through the second exhaust passage near the upper part of the compartment even if heat is accumulated on the upper part of the compartment. As a result, it is possible to maintain low temperature of the atmosphere in the compartment, and to contribute to maintenance of the temperature of the structural member at allowable temperature or lower.

The present invention makes it possible to prevent overheating of the structural member that faces the rear side of the fire wall and to maintain the temperature of the structural member at allowable temperature or lower.

DETAILED DESCRIPTION OF THE PREFERRED EMBODIMENTS

Some embodiments of the present invention are described below with reference to the accompanying drawings.

First Embodiment

Figure 1:
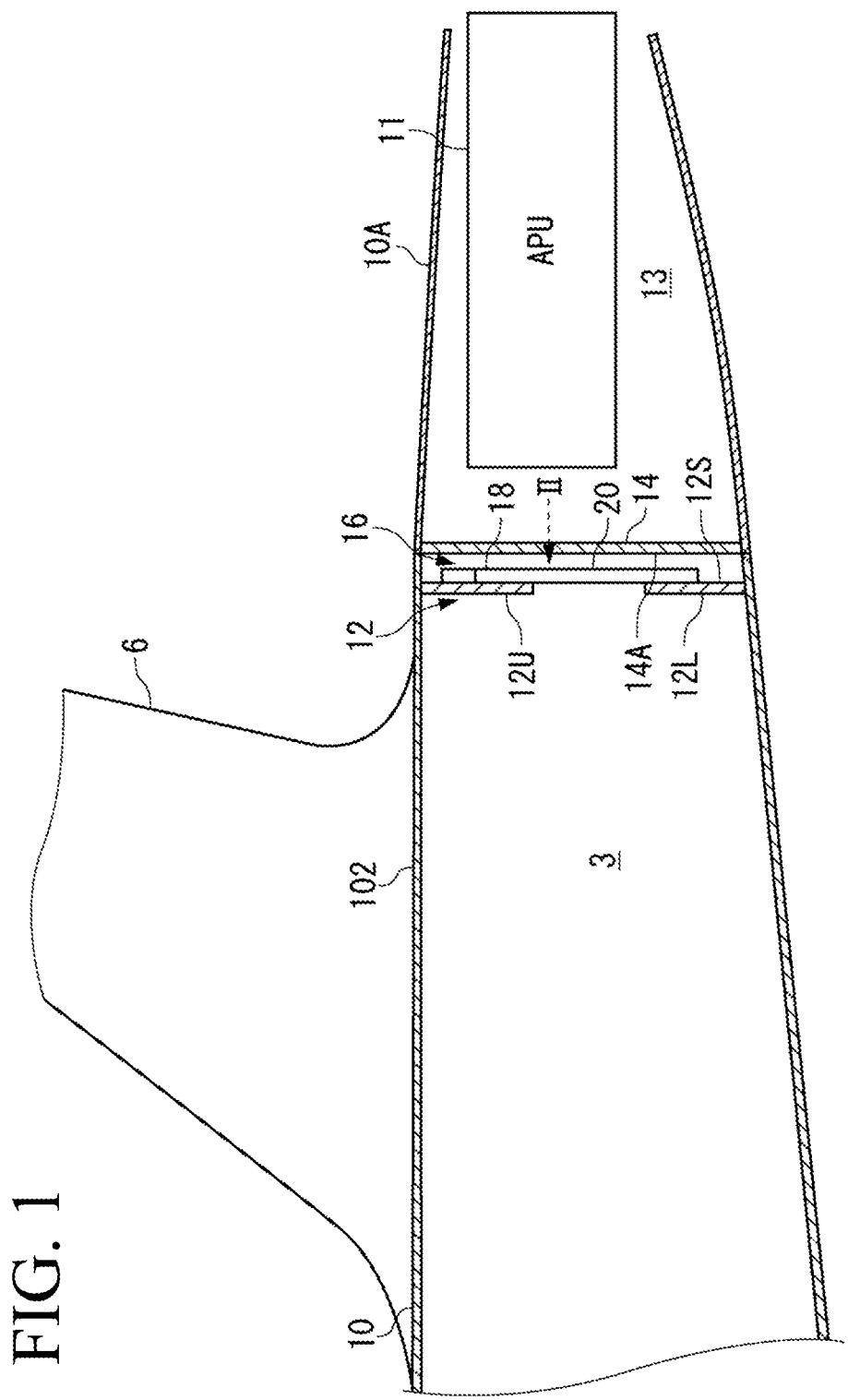
FIG. 1 is a diagram schematically illustrating an APU, a fire wall, and a pivot bulkhead that are provided on an end of a rear fuselage of an aircraft according to a first embodiment.

An auxiliary power unit (APU) 11 is provided at an end of a rear fuselage 10 of an aircraft illustrated in FIG. 1. The auxiliary power unit 11 is disposed inside a tail cone 10A (an APU chamber 13).

A pivot bulkhead 12 is provided inside the rear fuselage 10 in front of the auxiliary power unit 11.

Figure 2:
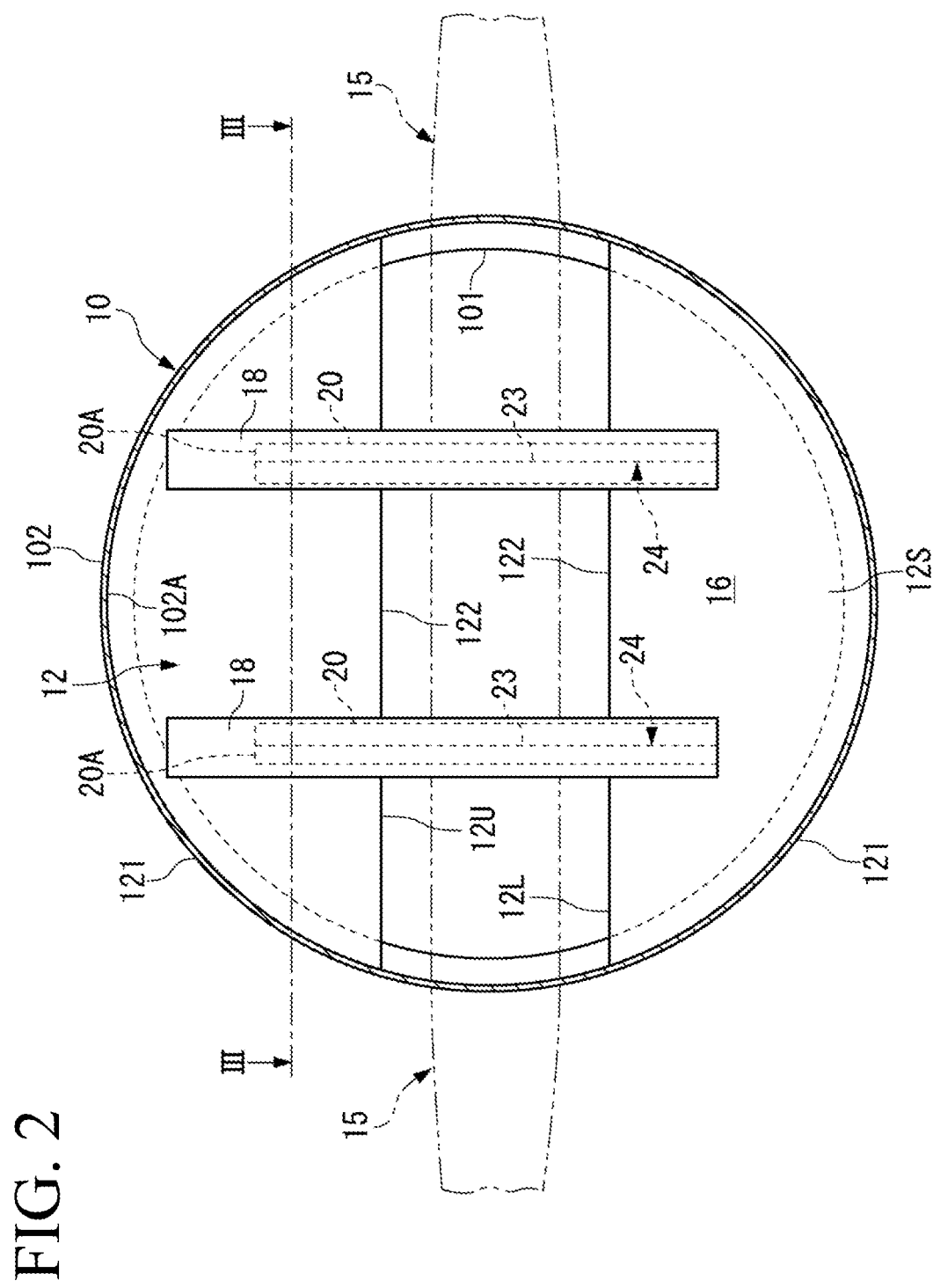
FIG. 2 is a diagram illustrating the pivot bulkhead as viewed from a direction illustrated by arrow II in FIG. 1.

The rear fuselage 10 includes: annular frames 101 (one of them is illustrated in FIG. 2) that are disposed at intervals in an axis direction of an airframe; a skin 102 supported by the frames 101; and an unillustrated stringer that reinforces the skin 102.

A vertical tail 6 (FIG. 1) is supported by the frames 101 and the unillustrated stringer of the rear fuselage 10.

A fire wall 14 that is resistant to flame is provided between the pivot bulkhead 12 and the auxiliary power unit 11 in case a fire occurs in the APU chamber 13.

The fire wall 14 is made of a metal material in a disk shape. The metal material contains titanium or other materials and has high heat resistance. A space between an outer circumferential part of the fire wall 14 and an inner circumferential part of the tail cone 10A is tightly sealed.

The pivot bulkhead 12 is a structural member facing a back surface 14A (rear side) of the fire wall 14.

The pivot bulkhead 12 separates the APU chamber 13 from an inside of the rear fuselage 10 located in front of the APU chamber 13. A horizontal tail 15 (FIG. 2) is supported by a coupling member 20 of the pivot bulkhead 12.

The pivot bulkhead 12 is supported by the frames 101 and is surrounded by the skin 102.

Hereinafter, the skin including a skin of the tail cone 10A that surrounds the fire wall 14 (FIG. 1) is collectively referred to as the skin 102 of the rear fuselage 10.

The pivot bulkhead 12 includes: an upper bulkhead 12U; a lower bulkhead 12L; and two coupling members 20 that couple the upper bulkhead 12U to the lower bulkhead 12L.

Each of the upper bulkhead 12U, the lower bulkhead 12L, and the coupling members 20 is made of an aluminum alloy.

In FIG. 2, only outline of the horizontal tail 15 is schematically illustrated.

An arc-shaped peripheral part 121 of the upper bulkhead 12U is jointed to the frames 101 of the rear fuselage 10. Illustration of the frames 101 is omitted in FIG. 1, FIG. 3, and FIG. 4.

An arc-shaped peripheral part 121 of the lower bulkhead 12L is also jointed to the frames 101 of the rear fuselage 10.

A linear part 122 of the upper bulkhead 12U and a linear part 122 of the lower bulkhead 12L are separated from the horizontal tail 15 with a distance. The APU chamber 13 and a compartment 3 communicate with each other at a position other than the coupling members 20.

The coupling members 20 each straightly extend along a direction of connecting the upper bulkhead 12U with the lower bulkhead 12L, namely, in a vertical direction. The coupling members 20 couple the upper bulkhead 12U to the lower bulkhead 12L. Accordingly, the upper bulkhead 12U, the lower bulkhead 12L, and the coupling members 20 as a whole receive bending that is applied to the pivot bulkhead 12. The upper bulkhead 12U may be coupled to the lower bulkhead 12L by three or more coupling members 20 as necessary.

The coupling members 20 are disposed symmetrically to an axial center of the rear fuselage 10.

Each of the coupling members 20 has an H-shaped cross-sectional surface as illustrated in FIG. 3.

As illustrated in FIG. 1, each of the coupling members 20 projects from a surface 12S of the upper bulkhead 12U and the lower bulkhead 12L toward the fire wall 14.

As illustrated in FIG. 3, each of the coupling members 20 has a flange 21, a flange 22, and a web 23. The flange 21 faces the rear surface 14A of the fire wall 14. The flange 22 is jointed to the surface 12S, on the fire wall 14 side, of the upper bulkhead 12U and the lower bulkhead 12L. The web 23 couples the flange 21 to the flange 22.

The pivot bulkhead 12 according to the present embodiment is maintained at temperature that is allowable based on necessary bearing force and necessary strength or lower even if fire occurs in the APU chamber 13 (FIG. 1).

If temperature of the fire wall 14 is increased by heat of flame in the APU chamber 13, heat is radiated from the fire wall 14 to the rear surface 14A side. A heat shielding member 18 that shields the pivot bulkhead 12 from the heat is provided in each of the coupling members 20.

As illustrated in FIG. 2, the heat shielding member 18 covers the corresponding coupling member 20 along a length direction of the coupling member 20. An upper end of the heat shielding member 18 extends to a vicinity of an inner surface 102A of the skin 102 beyond an upper end 20A of the coupling member 20.

A lower end of the heat shielding member 18 extends to the position same as the lower end of the corresponding coupling member 20 but does not project downward from the lower end of the corresponding coupling member 20.

The heat shielding member 18 shuts off the radiant heat from the fire wall 14, thereby suppressing heat generation of the pivot bulkhead 12.

In this case, the heat shielding member 18 shuts off the radiant heat from the fire wall 14 through reflection mainly.

The heat shielding member 18 includes, as a front layer, a layer reflecting heat rays (mainly, infrared rays) radiated from the fire wall 14, and has a sheet shape as a whole.

For example, a heat-resistant base material such as glass wool provided with a film made of aluminum, titanium, or other material may be used as the heat shielding member 18. The heat shielding member 18 has flexibility and is bendable.

Alternatively, a base material such as an aluminum alloy, the surface of which is polished and processed to a mirror surface, or a base material such as an aluminum alloy provided with a gloss layer through plating or other method may be used as the heat shielding member 18.

To obtain more sufficient heat insulation effect, the surfaces of the respective coupling members 20 may be preferably subjected to mirror polishing.

The heat shielding member 18 may be so held through an appropriate method as to cover the coupling member 20. To hold the heat shielding member 18, the heat shielding member 18 may be screwed, or for example, may be fastened around the coupling member 20 with use of a heat-resistant corded member to be held.

Figure 3A:
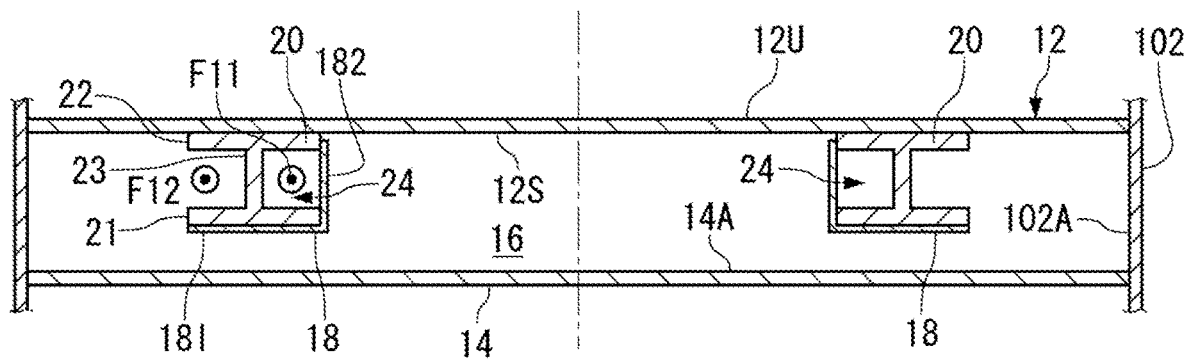
FIG. 3A is a cross-sectional diagram taken along line in FIG. 2.
Figure 3B:
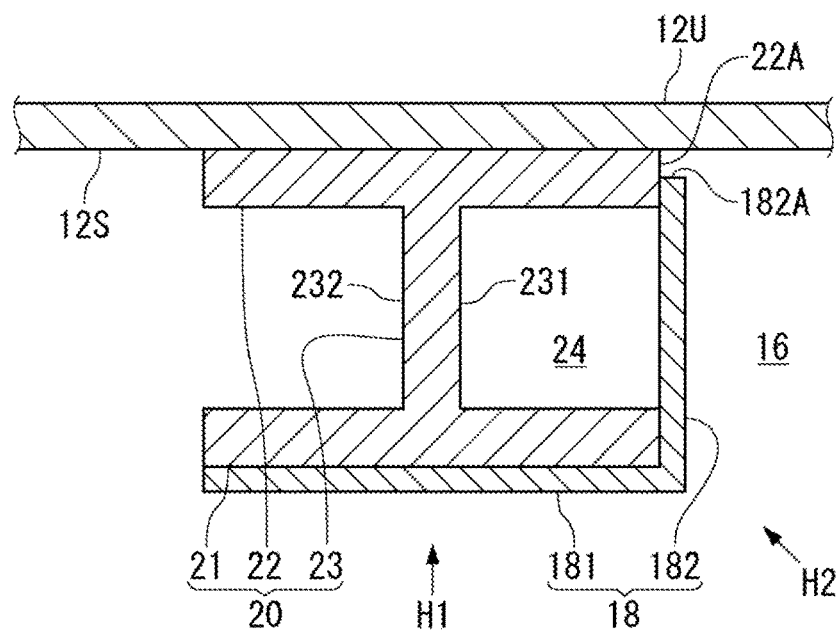
FIG. 3B is a partial enlarged view of FIG. 3A.

As illustrated in FIG. 3B, the heat shielding member 18 integrally includes a first part 181 and a second part 182. The first part 181 faces a surface of the flange 21 of the coupling member 20. The second part 182 faces one side surface 231 of the web 23 of the coupling member 20.

The heat shielding member 18 is formed to have an L-shaped cross-sectional surface through being bent at a boundary between the first part 181 and the second part 182.

The first part 181 is overlapped with the surface of the flange 21. The heat shielding member 18 is supported by the coupling member 20 at the first part 181.

The second part 182 faces the side surface 231 located on the center side of the fire wall 14, out of the side surfaces 231 and 232 of the web 23. A flow path 24 through which air in a space 16 between the fire wall 14 and the pivot bulkhead 12 flows, is provided between the second part 182 and the side surface 231. The flow path 24 is provided over the entire length of the heat shielding member 18. An upper end and a lower end of the flow path 24 are open to the space 16.

In the present embodiment, an end part 182A of the second part 182 is in contact with an end part 22A of the flange 22. The closed flow path 24 is formed by being surrounded by the flange 21, the web 23, the flange 22, and the second part 182.

Note that the end part 182A of the second part 182 may be abutted on the surface 12S of the upper bulkhead 12U and the lower bulkhead 12L, or may be abutted on the surface of the flange 22.

A gap may be provided between the end part 182A of the second part 182 and the surface 12S, or between the end part 182A of the second part 182 and the flange 22. In other words, the flow path 24 is not necessarily surrounded completely. The air flowing along the coupling member 20 including the flow path 24 is described later.

In the coupling member 20, the flange 21 is located most closely to the fire wall 14, and the temperature of the flange 21 is most easily increased because the space between the flange 21 and the fire wall 14 is small. The first part 181 of the heat shielding member 18 covers the entire surface of the flange 21, and shields the flange 21 from heat ray H1 (FIG. 3B) released from the fire wall 14.

In addition, the second part 182 of the heat shielding member 18 shields the web 23 from heat ray H2 (FIG. 3B) released from the fire wall 14.

In this case, the side surface 231 of the web 23 located on the center side of the fire wall 14 is widely open to the heat rays released from the fire wall 14, as compared with the side surface 232 on the opposite side. When it is assumed as an example that fire occurs from an accessory disposed inside the APU chamber 13, temperature distribution of the heat rays released from the fire wall 14 is increased as the position is closer to the center part of the fire wall 14. The second part 182 makes it possible to shield the web 23 from the heat rays that head for the side surface 231 located on the center side of the fire wall 14.

In the present embodiment, the heat shielding member 18 shields the pivot bulkhead 12 from the radiant heat, and the heat is dissipated to the outside of the space 16 through the skin 102 while the air in the space 16 between the fire wall 14 and the pivot bulkhead 12 is circulated by convection as well. This maintains the temperature of the pivot bulkhead 12 at allowable temperature or lower when fire occurs in the APU chamber 13.

In the present embodiment, the pivot bulkhead 12 and the fire wall 14 are located in proximity to each other, and the narrow space 16 is provided between the pivot bulkhead 12 and the fire wall 14.

The description is given below with reference to FIG. 4 and FIGS. 3A and 3B.

When fire occurs, heat is radiated from the fire wall 14, the temperature of which is increased by heat of flame. As a result, the air in the space 16 (FIG. 3B) between the fire wall 14 and the pivot bulkhead 12 is heated.

In contrast, the heated air in the space 16 is cooled when being in contact with the inner surface 102A of the skin 102 that is in contact with the outside air. Dashed arrows illustrated in FIG. 4 indicate that the air in the space 16 is cooled by the skin 102 and the heat of the air is accordingly dissipated to the outside air through the skin 102.

The air that is in contact with the inner surface 102A of the skin 102 is cooled over the entire circumference of the skin 102 surrounding the space 16; however, the heat dissipation is large at the upper part of the skin 102, and the heat dissipation becomes small toward the lower part because of an effect of the air convection described later.

A phenomenon of the air convection occurring in the space 16 is described now.

The heated air rises at a position away from the skin 102 in the space 16. The heated air normally rises in the vertical direction if other air flow or a local heat source is absent.

At this time, an upward flow F0 (FIG. 4) becomes a main flow. This is because an opening area is larger and pressure loss is smaller than the other parts, and a flow rate is accordingly large, as illustrated in FIG. 3A. The air at that part, however, is substantially not varied in temperature in the vertical direction due to the radiant heat from the fire wall 14. In other words, density difference of the air does not occur, which causes the flow velocity to be decreased.

In contrast, the air in the space shielded by the heat shielding member 18 is small in temperature increase by the radiant heat from the fire wall 14, whereas the air just below the lower end of the heat shielding member 18 is increased in temperature by the radiant heat from the fire wall 14. This causes temperature difference between both airs, namely, forms the upward flow F1 through the chimney effect due to the density difference of the air. The flow velocity of the upward flow F1 increases as the length of the heat shielding member 18 in the vertical direction increases.

Accordingly, providing the flow path by the heat shielding member 18 makes it possible to newly generate the upward flow F1 that is faster in flow velocity than the upward flow F0, and to more efficiently dissipate the radiant heat from the fire wall 14 to the outside of the aircraft through the skin 102.

Next, the flow of the upward flow F1 is described. As illustrated by solid arrows in FIG. 4, the heated air rises along the coupling members 20 (the upward flow F1). In other words, the coupling members 20 guide, upward, the air that is heated and raised so as to bridge the gap between the upper bulkhead 12U and the lower bulkhead 12L. The coupling members 20 that reinforce the upper bulkhead 12U and the lower bulkhead 12L also function as the guide members of the airflow.

Figure 4:
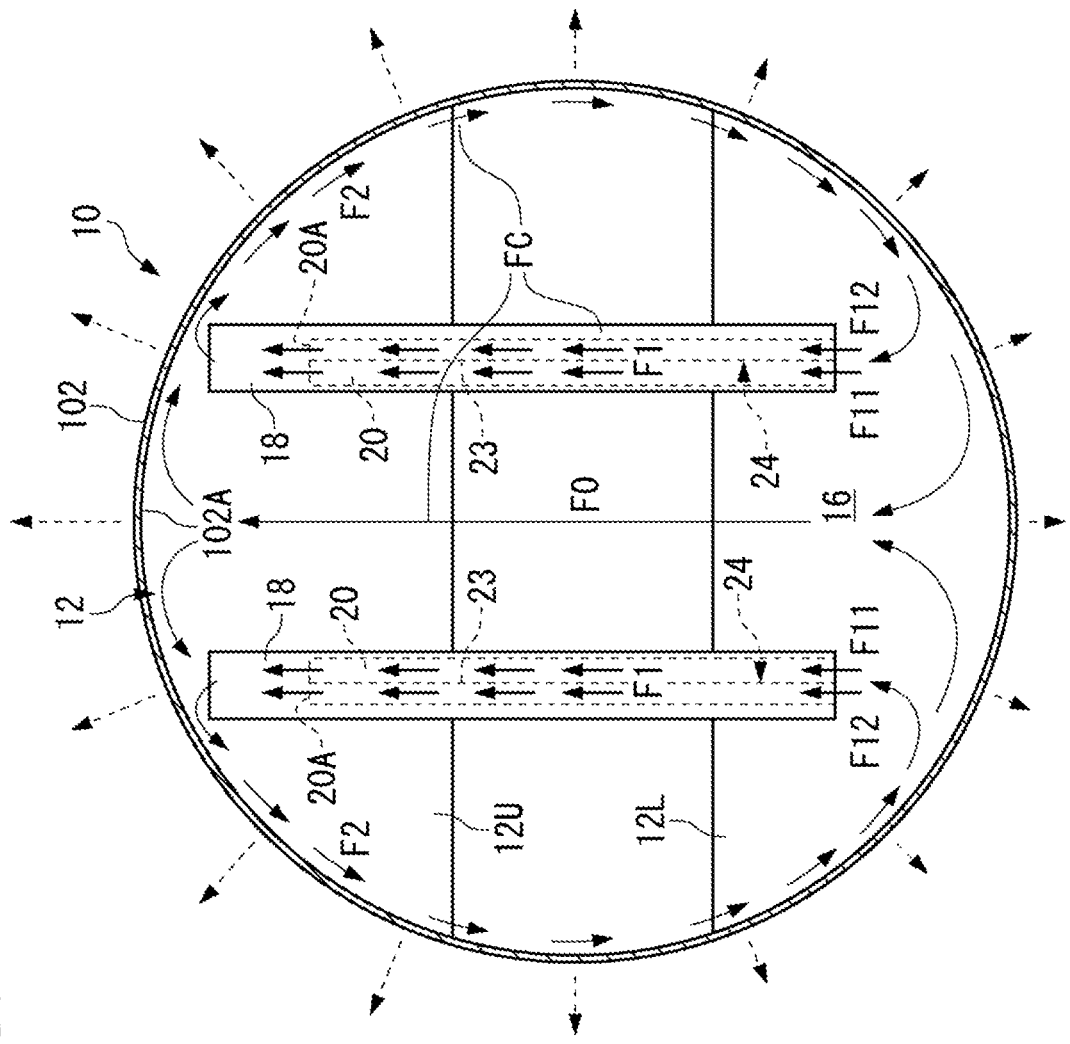
FIG. 4 is a diagram to explain a flow of air in a space between the fire wall and the pivot bulkhead.

As illustrated in FIG. 4, the upward flow F1 flows along the coupling members 20 on the right and left sides of the respective webs 23 of the coupling members 20 (F11 and F12). As illustrated in FIG. 3A, the upward flow F11 flows through the flow path 24 between the one side surface 231 of the web 23 and the second part 182 of the heat shielding member 18. Since the second part 182 exists, the space of the flow path 24 is difficult to be influenced by heat of the fire wall 14. In addition, the chimney effect by the temperature difference (the density difference) between the flow path 24, the upper end of which is cooled by the skin 102, and the outside space 16 makes it possible to secure the flow velocity of the upward flow F11. In addition, the upward flow F12 passes through the other side surface 232 of the web 23. Since the other surface 232 does not face the heat shielding member 18, the flow path of the upward flow F12 is open to the space 16.

The upward flows F11 and F12 form one upward flow F1 as a whole.

As illustrated in FIG. 4, the upward flow F1 comes into contact with the skin 102 and is then cooled by the skin 102, thereby being changed to a downward flow. At this time, since the upward flow F1 is blown toward the skin 102 and the upper bulkhead 12U exists on the backside of the flow, the air cooled by the skin 102 so flows in the circumferential direction of the skin 102 as to follow the inner surface 102A of the skin 102, as illustrated by the solid arrows (the downward flow F2). Further, the air is cooled by the skin 102 in the process of flowing along the skin 102. As illustrated in FIG. 4, a circulating flow FC including the upward flows F0 and F1 and the downward flow F2 is formed as a whole in the space 16. As illustrated in FIG. 4, paired circulating flows FC on the right side and the left side are formed in the space 16.

A portion of the air descended to the lower part in the space 16 rises again from the lower end of the coupling member 20 along the coupling members (F1). At this time, the air (F11) flows into a lower opening of the flow path 24 that is provided on the one side surface 231 side of the web 23, and is guided upward through the flow path 24. The air (F12) is guided upward along the other side surface 232 of the web 23.

The upward flow F1 including the upward flows F11 and F12 is blown to the skin 102 near the top of the space 16 after going over the respective upper ends of the coupling member 20 and the heat shielding member 18. The air cooled by the skin 102 at that position then flows along the inner surface 102A of the skin 102.

In the present embodiment, since the heat shielding member 18 projects upward from the upper end 20A of the coupling member 20, the upward flow F1 is more sufficiently blown to the skin 102 along the heat shielding member 18. As a result, the downward flow F2 flows near the inner surface 102A of the skin 102, which makes it possible to promote heat dissipation through the skin 102.

When the flow path 24 is provided between the coupling member 20 and the heat shielding member 18, the upward flow F11 is more sufficiently guided along the coupling member 20, as compared with a case in which the flow path 24 is not provided. This causes the air to stably flow as compared with other air flow in the space 16, which makes it possible to stably and continuously generate the circulating flow FC. In other words, the heat shielding member 18 forms the flow path 24 between the heat shielding member 18 and the coupling member 20, thereby enhancing the effect of dissipating heat of the air in the space 16 through the circulating flow FC.

In the present embodiment, the flow path 24 is formed by the heat shielding member 18 on one side of the coupling member 20 to enhance the guiding effect of the upward flow F11 while the other side of the coupling member 20 is open to the space 16 to reduce pressure loss of the upward flow F12 and secure the flow velocity.

As mentioned above, the upward flow F11 that forms the circulating flow FC secures the stable flow velocity by the chimney effect. Therefore, during flight, the circulating flow FC having sufficient flow rate occurs based on remarkable temperature difference between the outside air and the air in the space 16 when fire occurs in the APU chamber 13. This makes it possible to efficiently exhaust heat generated by the fire to the outside of the aircraft.

The circulating flow FC in the space 16 is continuously cooled by coming into contact with the skin 102. The temperature increase of the coupling member 20 is suppressed by the heat shielding member 18, and the heat is exhausted to the outside of the aircraft through the air in the space 16 as heat medium. Accordingly, it is possible to prevent overheating of the coupling member 20 and the pivot bulkhead 12.

The fire in the APU chamber 13 is extinguished by fire extinguishing equipment (not illustrated) within predetermined estimated time after fire occurrence. The fire extinguishing equipment detects fire occurrence and introduces inert gas such as halon into the APU chamber 13.

The heat shielding member 18 maintains the state of covering the coupling member 20 to continuously shield the coupling member 20 from the radiant heat for the estimated time until fire extinction. At this time, since the flow path 24 between the heat shielding member 18 and the coupling member 20 is maintained, the flow rate of the circulating flow FC including the upward flows F0 and F1 and the downward flow F2 is maintained. This further suppresses overheating in the space 16, which makes it possible to prevent overheating of the pivot bulkhead 12.

The shielding of the coupling member 20 from the radiant heat and the circulating flow FC that is formed in the space 16 between the fire wall 14 and the pivot bulkhead 12 as mentioned above make it possible to maintain the temperature of the coupling member 20 and the pivot bulkhead 12 at allowable temperature or lower at least for the estimated time until fire extinction.

In the first embodiment, the surface 12S of the upper bulkhead 12U and the lower bulkhead 12L may also be covered with a heat shielding member similar to the heat shielding member 18. This makes it possible to more sufficiently shield the pivot bulkhead 12 from the radiant heat by the fire wall 14.

In addition, a heat insulation material may be provided on one or both of the pivot bulkhead 12 and the fire wall 14 according to the first embodiment. The heat insulation material suppresses the temperature increase of the pivot bulkhead 12 by the radiant heat from the fire wall 14 for a predetermined time. Accordingly, using the heat insulation material makes it possible to more sufficiently prevent overheating of the pivot bulkhead 12 within the estimated time until fire extinction.

Figure 5A:
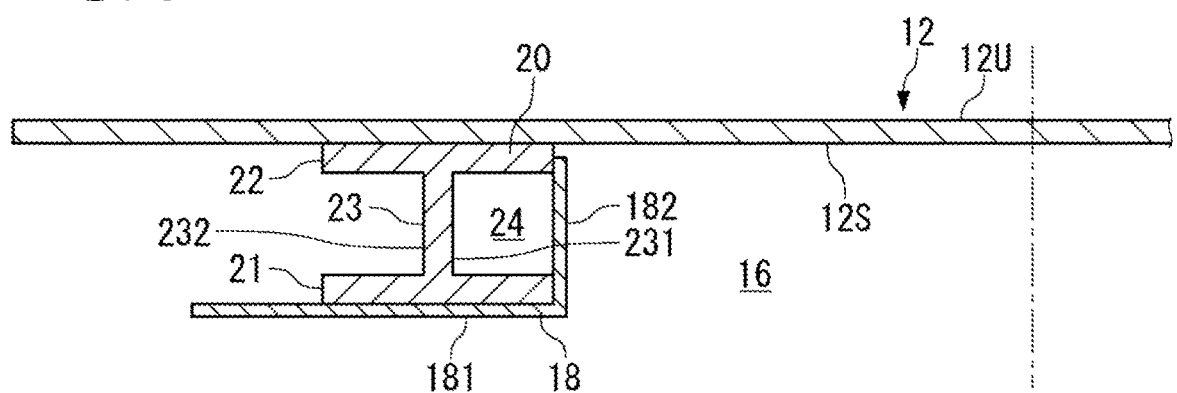
FIGS. 5A and 5B are diagrams each illustrating another form of a heat shielding member according to the first embodiment.
Figure 5B:
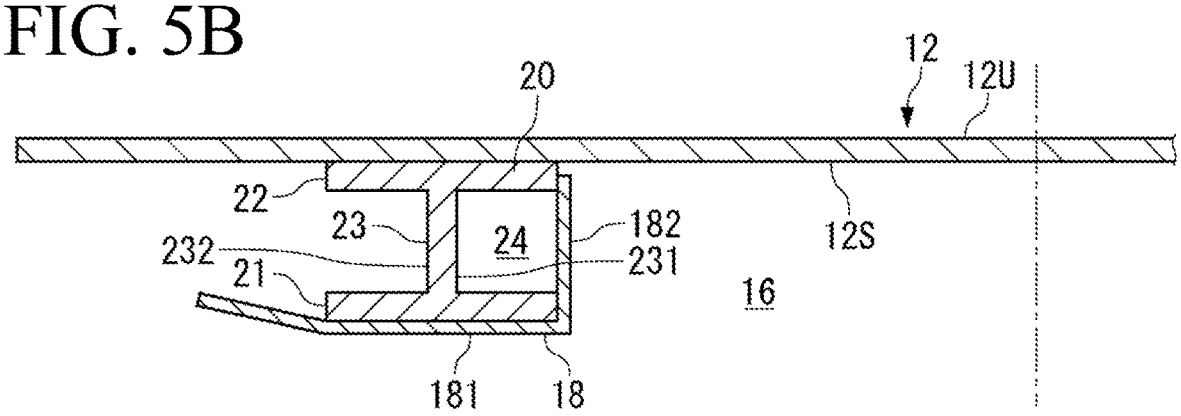

FIGS. 5A and 5B are diagrams each illustrating a modification of the heat shielding member 18 (FIG. 3) according to the first embodiment.

The first part 181 of the heat shielding member 18 illustrated in FIG. 5A has a width larger than that illustrated in FIGS. 3A and 3B, and is protruded from the flange 21 of the coupling member 20 toward the outer circumference. A portion of the first part 181 protruded from the flange 21 may extend in parallel to the flange 21 or may be inclined to the flange 21 as illustrated in FIG. 5B.

As with the first embodiment, any configuration illustrated in FIGS. 5A and 5B forms the flow path 24 between the second part 182 of the heat shielding member 18 and the side surface 231 of the web 23. At the same time, heat insulation on the side surface 232 side of the web 23 is achieved by the first part 181 of the heat shielding member 18 protruded from the flange 21 toward the outer circumference while the opposite side of the flow path 24 is reduced in pressure loss of airflow to secure flow velocity and is open to the space 16.

Figure 6A:
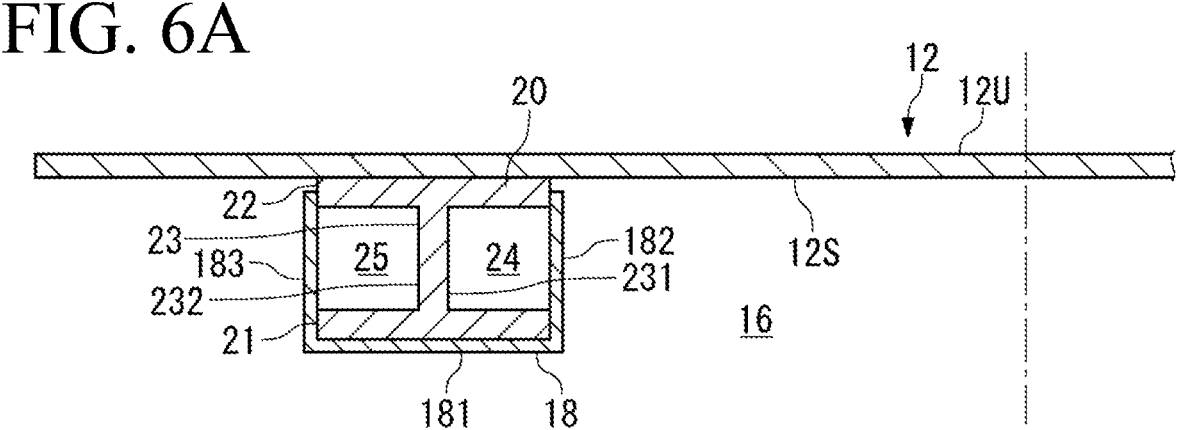
FIGS. 6A to 6C are diagrams each illustrating still another form of the heat shielding member according to the first embodiment.

FIG. 6A is a diagram illustrating an example in which priority is placed on guide effect improvement and heat insulation effect improvement by formation of the flow path. The heat shielding member 18 illustrated in FIG. 6A includes a third part 183 that faces the side surface 232 of the web 23. The flow path 24 between the second part 182 and the side surface 231 of the web 23 and a flow path 25 between the third part 183 and the side surface 232 of the web 23 make it possible to more surely guide the upward flow F1. In addition, the third part 183 makes it possible to shield the coupling member 20 from heat rays that head for the side surface 232.

Figure 6B:
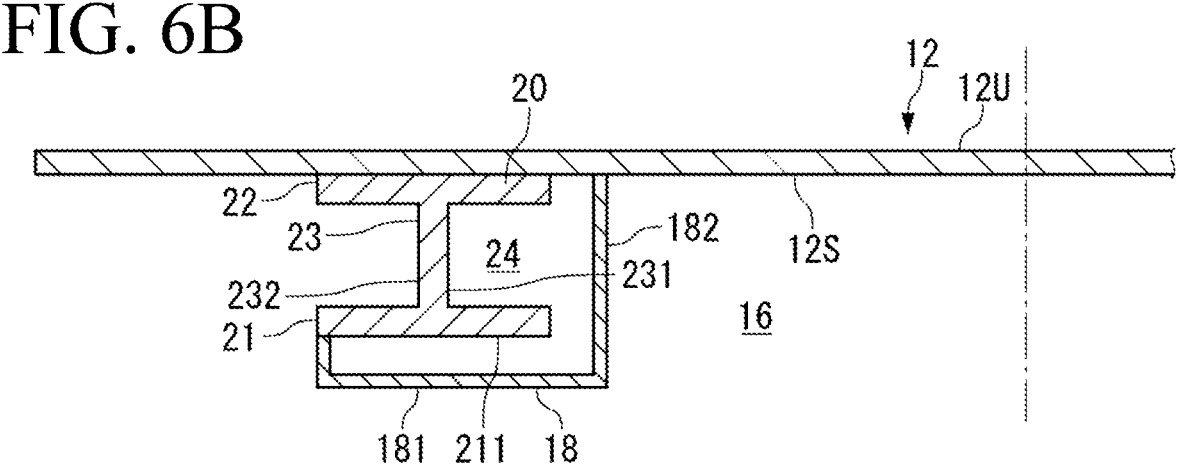

As illustrated in FIG. 6B, a flow path between the coupling member 20 and the heat shielding member 18 may be provided on the surface side of the flange 21. In the example illustrated in FIG. 6B, the flow path 24 is provided between the heat shielding member 18 and the surface 211 of the flange 21 and between the heat shielding member 18 and the side surface 231 of the web 23.

Figure 6C:
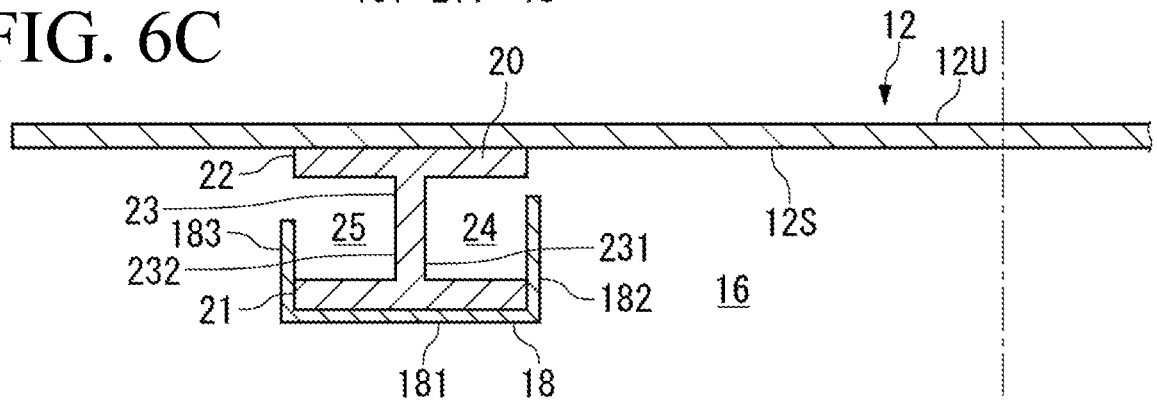

FIG. 6C is a diagram illustrating an example in which the guide effect improvement and the heat insulation effect improvement are balanced with pressure loss reduction.

The heat shielding member 18 is bent toward the surface 12S of the upper bulkhead 12U and the lower bulkhead 12L on both sides of the flange 21 of the coupling member 20. The second part 182 faces the one side surface 231 of the web 23 with an interval, and the third part 183 faces the other side surface 232 of the web 23 with an interval. About half of the side surface 232 is covered with the third part 183, and about half of the side surface 232 is open. The second part 182 covers the side surface 231 in a wider range than the third part 183.

The flow path 24 surrounded by the flange 21, the side surface 231, the flange 22, and the second part 182 is provided on the side surface 231 side.

The flow path 25 surrounded by the flange 21, the side surface 232, the flange 22, and the third part 183 is provided on the side surface 232 side.

Figure 7A:
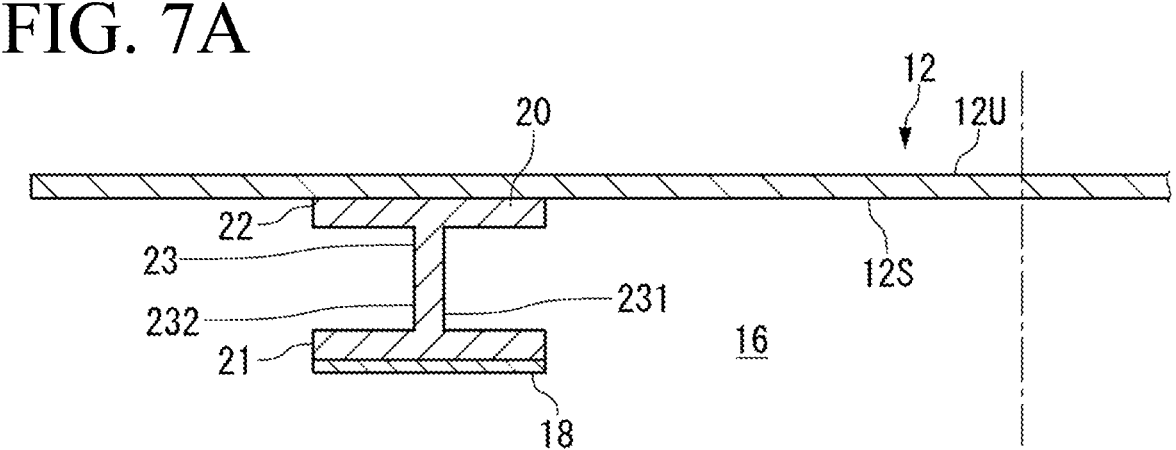
FIGS. 7A and 7B are diagrams each illustrating still another form of the heat shielding member according to the first embodiment.

In an example illustrated in FIG. 7A, only the flange 21 of the coupling member 20 is covered with the heat shielding member 18, and the side surfaces 231 and 232 of the web 23 are wholly open to the space 16.

Even if the flow path 24 and the flow path 25 by the heat shielding member 18 are not provided, when the temperature of the coupling member 20 is maintained at allowable temperature or lower for an estimated time until fire extinction by the circulating flow FC (FIG. 4) in the space 16 and the shielding of the flange 21 by the heat shielding member 18, only the flange 21 of the coupling member 20 that is located most closely to the fire wall 14 may be covered with the heat shielding member 18, as with the example.

Figure 7B:
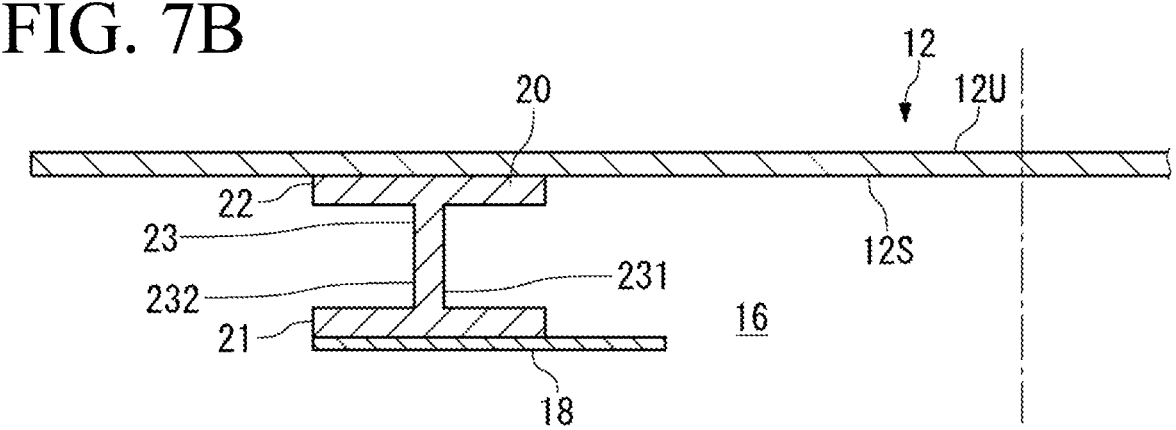

As illustrated in FIG. 7B, increasing the heat shielding member 18 in width to be protruded from the flange 21 makes it possible to obtain an effect of shielding the side surface 231 of the web 23 from heat rays.

Figure 8A:
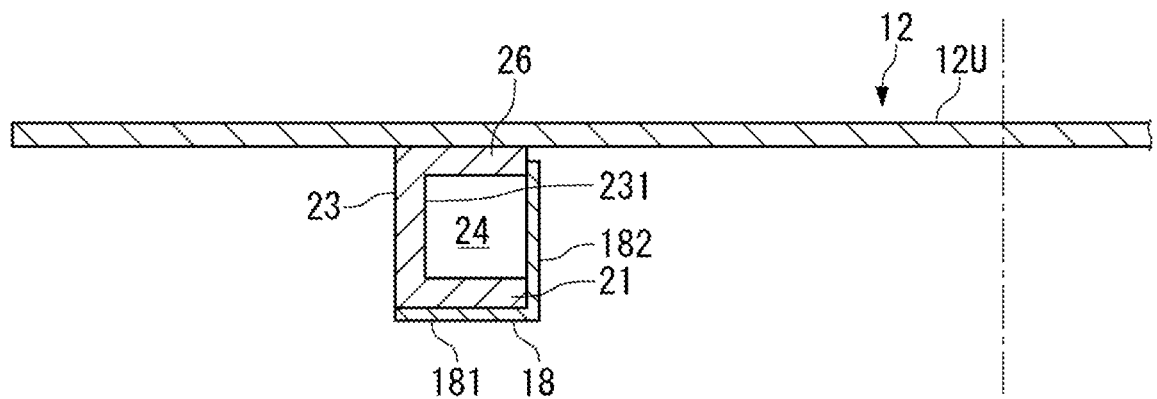
FIGS. 8A and 8B are diagrams each illustrating a construction example of the heat shielding member that is provided to a coupling member having a form different from a form of the coupling member according to the first embodiment.

FIG. 8A is a diagram illustrating a coupling member 26 that has a cross-sectional shape different from that of the coupling member 20 according to the first embodiment. The coupling member 26 has a groove-shaped (C-shaped) cross-sectional shape, and is covered with the heat shielding member 18.

The flange 21 of the coupling member 26 disposed to face the fire wall 14 is covered with the first part 181 of the heat shielding member 18.

The second part 182 of the heat shielding member 18 is disposed to face the side surface 231 of the web 23 of the coupling member 26 with an interval, and the flow path 24 is provided between the second part 182 and the side surface 231.

Figure 8B:
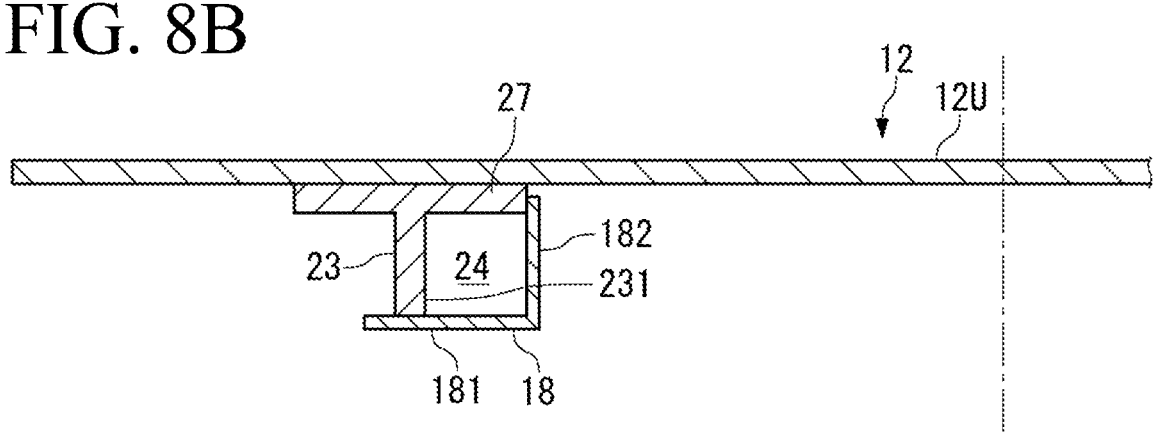

FIG. 8B is a diagram illustrating a coupling member 27 that has a T-shaped cross-sectional surface, and the coupling member 27 is also covered with the heat shielding member 18.

A front end of the web 23 of the coupling member 27 that is located most closely to the fire wall 14 is covered with the first part 181 of the heat shielding member 18.

In addition, the second part 182 of the heat shielding member 18 is disposed to face the side surface 231 of the web 23 of the coupling member 27 with an interval, and the flow path 24 is provided between the second part 182 and the side surface 231.

The coupling members 26 and 27 respectively illustrated in FIGS. 8A and 8B also each form the flow path 24 that contributes to guiding of the upward flow F1 while shielding heat by the heat shielding member 18.

A coupling member having an appropriate cross-sectional shape may be adopted to the pivot bulkhead 12, in addition to the coupling members 20, 26, and 27. The heat shielding member 18 may be provided in an appropriate form with respect to the coupling member. It is unnecessary for the heat shielding member 18 to be a bendable sheet, and the heat shielding member 18 in which the second part 182 is shaped in a bent shape with respect to the first part 181 may be used. As a method of holding the heat shielding member 18, an appropriate method such as attaching of the heat shielding member 18 to the flange 21 of the coupling member 20 or attaching of the heat shielding member 18 to the upper bulkhead 12U and the lower bulkhead 12L may be adopted.

Second Embodiment

Next, a second embodiment of the present invention is described with reference to FIG. 9.

In the second embodiment, a configuration is illustrated that contributes to shielding by the heat shielding member 18 and the heat dissipation by the circulating flow FC in the space 16 as well as maintenance of the temperature of the coupling member 20 and the pivot bulkhead 12 at allowable temperature or lower.

Figure 9:
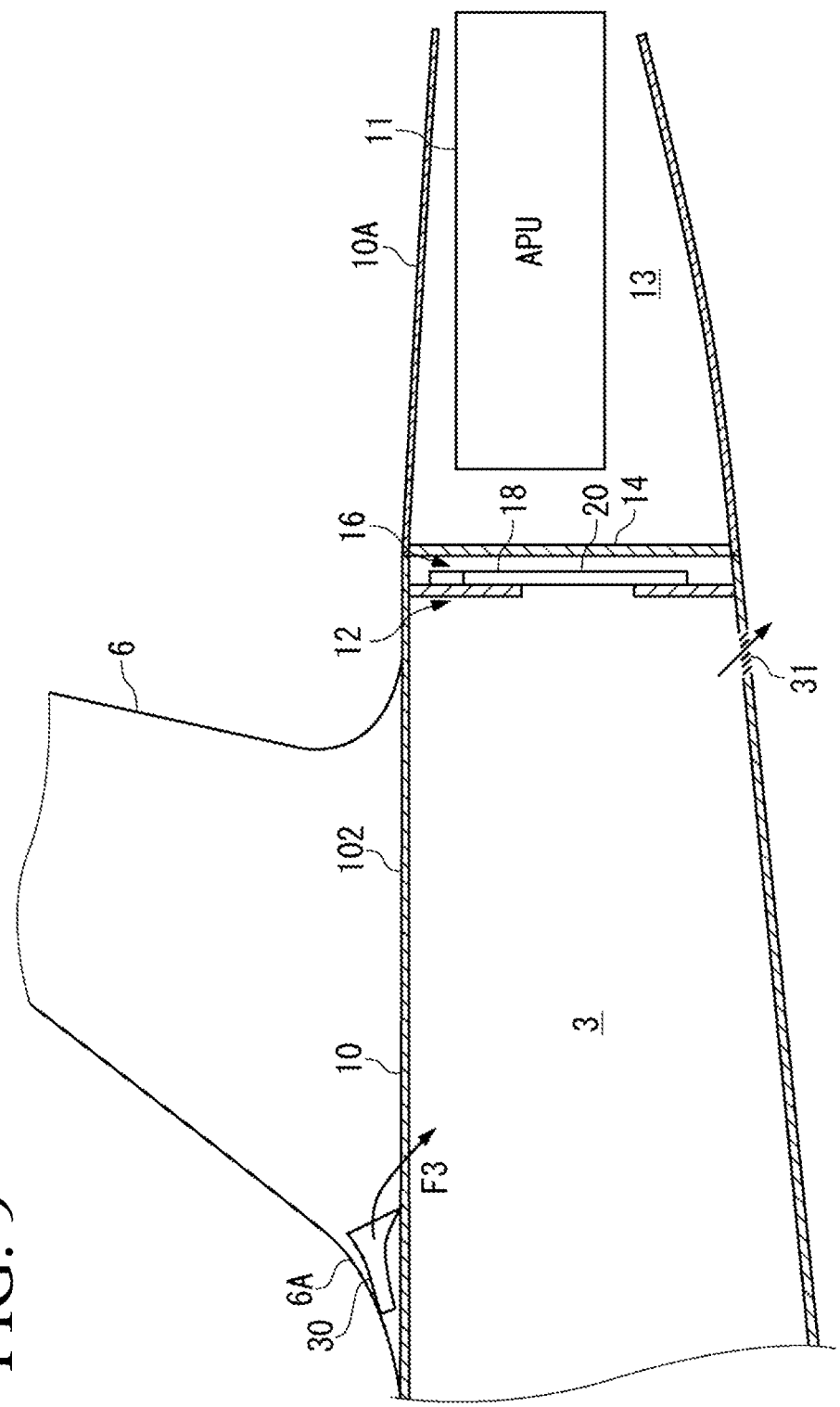
FIG. 9 is a diagram illustrating a compartment in a rear fuselage of an aircraft according to a second embodiment.

The compartment 3 that is surrounded by the skin 102 in front of the pivot bulkhead 12 is provided in the rear fuselage 10 of the aircraft illustrated in FIG. 9. Accessories are disposed in the compartment 3.

The compartment 3 includes: an intake passage 30 through which the outside air is taken into an upper part of the compartment 3; and an exhaust passage 31 through which the air is exhausted from the compartment 3 to outside of the compartment.

Out of the intake passage 30 and the exhaust passage 31, the intake passage 30 is relatively disposed on front side, and the exhaust passage 31 is relatively disposed on rear side.

The intake passage 30 is located on front side of the base of the vertical tail 6, and makes the compartment 3 communicate with the outside of the aircraft. An inlet of the intake passage 30 facing the outside air is a so-called NACA scoop (an NACA duct). The NACA scoop is recessed from the surface of a fairing 6A of the vertical tail 6 and has an opening cross-sectional area that continuously increases. The NACA scoop has a shape in which a horizontal width and a depth are gradually increased rearward from an inlet located on the front end. The NACA scoop allows for air intake while suppressing air resistance during flight.

The exhaust passage 31 makes the lower part of the compartment 3 communicate with the outside of the aircraft.

As illustrated in FIG. 9, in the present embodiment, the outside air is taken into the upper part in the compartment 3 through the intake passage 30 during flight. A flow F3 of the taken-in air is exhausted to the outside of the aircraft through the exhaust passage 31 in a state of conveying heat existing in the compartment 3 while spreading in the compartment 3.

The heat exhaust from the compartment 3 performed in such a manner reduces temperature of the atmosphere in the compartment 3.

Temperature reduction of the atmosphere in the compartment 3 makes it possible to prevent overheating of the coupling member 20 and the pivot bulkhead 12 that face the compartment 3, thereby contributing to maintenance of the temperature of the coupling member 20 and the pivot bulkhead 12 at allowable temperature or lower.

[Modification of Second Embodiment]

Next, a modification of the second embodiment of the present invention is described with reference to FIG. 10.

The compartment 3 in the modification of the second embodiment includes a second exhaust passage 32, in addition to the intake passage 30 and the exhaust passage (hereinafter, referred to as a first exhaust passage) of the second embodiment.

The second exhaust passage 32 exhausts the air from the upper part of the compartment 3 in a vicinity of the pivot bulkhead 12 behind the intake passage 30.

The second exhaust passage 32 is located on the rear side of the base of the vertical tail 6, and makes the compartment 3 communicate with the outside of the aircraft.

Figure 10:
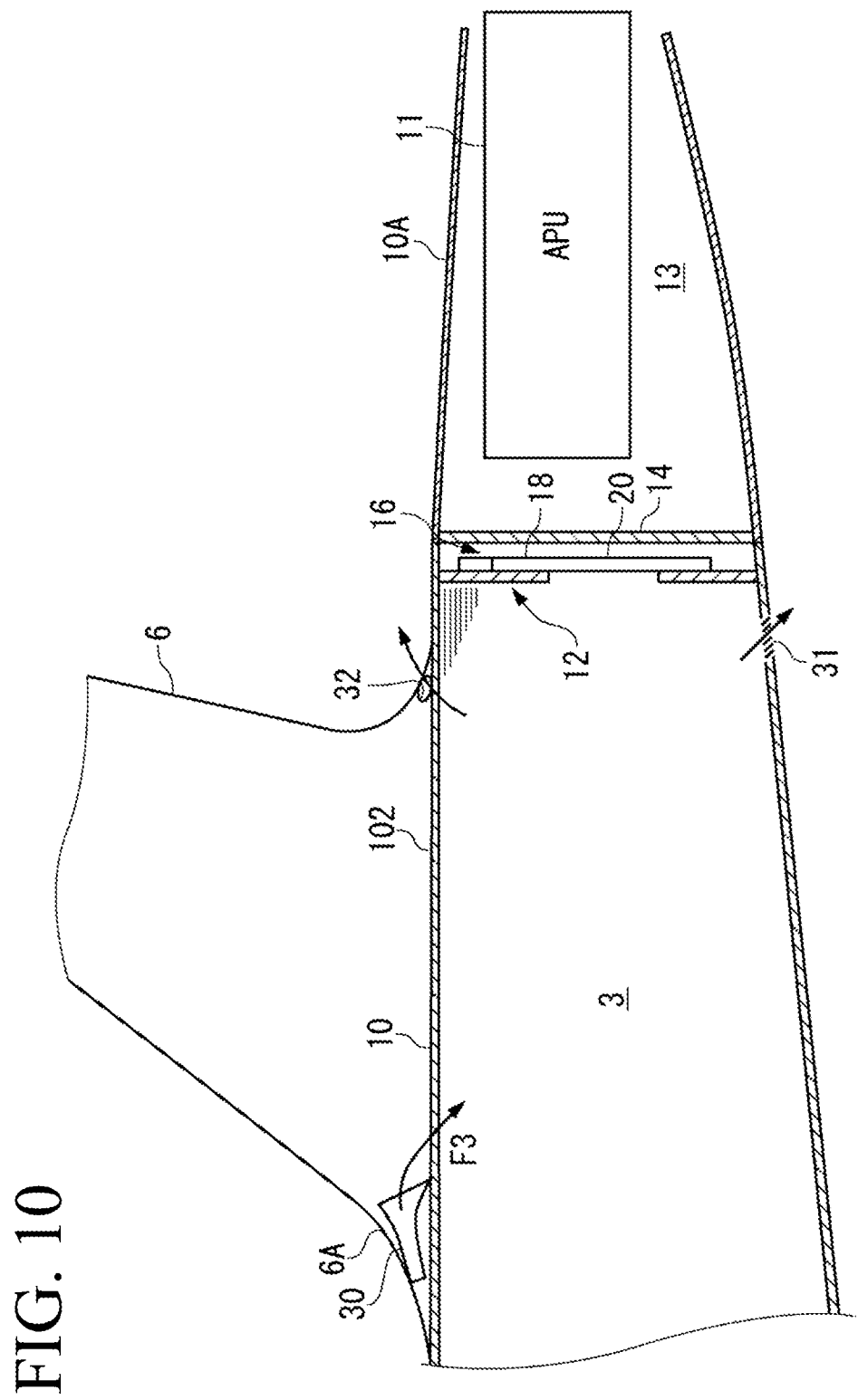
FIG. 10 is a diagram illustrating a compartment in a rear fuselage of an aircraft according to a modification of the second embodiment.

As illustrated in FIG. 10, the flow F3 of the air taken into the upper part of the compartment 3 through the intake passage 30 during flight spreads in the compartment 3, and is exhausted to the outside of the aircraft through the first exhaust passage 31 and the second exhaust passage 32. At this time, heat accumulated in the upper part of the compartment 3 is smoothly exhausted through the second exhaust passage 32 that is located near the upper part of the compartment 3. This makes it possible to maintain low temperature of the atmosphere in the compartment 3, and to contribute to maintenance of the temperature of the coupling member 20 and the pivot bulkhead 12 at allowable temperature or lower when fire occurs in the APU chamber 13.

Other than the above description, the configurations described in the above-described embodiments may be selected or deleted or the configuration may be appropriately modified without departing from the scope of the present invention.

What is claimed is:

1. An aircraft, comprising:
   a fire wall;
   a structural member facing a rear side of the fire wall, the rear side of the fire wall facing the structural member, the structural member comprising an upper bulkhead and a lower bulkhead that are separate and distinct from one another; and
   a skin surrounding the fire wall and the structural member,
   wherein the structural member further comprises a coupling member and a heat shielding member, the coupling member couples the upper bulkhead to the lower bulkhead, wherein the coupling member has first and second ends, the first end being disposed on a surface of the upper bulkhead that faces the fire wall and the second end being disposed on a surface of the lower bulkhead that faces the fire wall, the coupling member being configured to guide, upward, air existing on the rear side of the fire wall, and the heat shielding member shielding the coupling member from heat radiated by the fire wall,
   wherein the heat shielding member comprises a glass wool as a base material and a layer that reflects heat rays radiated from the fire wall,
   wherein the coupling member includes:
      a first flange facing the rear side of the fire wall and being covered with the heat shielding member,
      a second flange being jointed to the respective surfaces of the upper bulkhead and the lower bulkhead that face the fire wall, and
      a web coupling the first flange to the second flange and forming a flow path through which the air flows, between the web and the heat shielding member, and
   wherein the heat shielding member includes first and second parts, the first part extending along the first flange and the second part extending along the web.

2. The aircraft according to claim 1, wherein the coupling member supports a horizontal tail.

3. The aircraft according to claim 2, wherein the heat shielding member extends to a vicinity of an inner circumferential part of the skin beyond an upper end of the coupling member.

4. The aircraft according to claim 1, wherein the flow path is provided between the heat shielding member and a surface of the web located on a center side of the fire wall.

5. The aircraft according to claim 1, further comprising a compartment that is surrounded by the skin in front of the structural member, the compartment including an intake passage through which outside air is taken into an upper part of the compartment, and a first exhaust passage through which air is exhausted from the compartment to outside of the compartment.

6. The aircraft according to claim 5, wherein the compartment includes a second exhaust passage through which the air is exhausted from the upper part of the compartment near the structural member.

7. The aircraft according to claim 1, wherein the structural member is a pivot bulkhead.

8. A tail cone provided on an end of a fuselage of an aircraft, the tail cone comprising:
 an auxiliary power unit;
 a skin surrounding the auxiliary power unit;
 a fire wall that is disposed to seal a part between the fire wall and an inner circumferential part of the skin, and forms a compartment together with the skin, the compartment surrounding the auxiliary power unit;
 a structural member disposed in proximity to a rear side of the fire wall with respect to the compartment, the structural member comprising an upper bulkhead and a lower bulkhead that are separate and distinct from one another; and
 a coupling member that couples the upper bulkhead to the lower bulkhead, the coupling member having first and second ends, the first end being disposed on a surface of the upper bulkhead that faces the fire wall and the second end being disposed on a surface of the lower bulkhead that faces the fire wall,
 wherein the structural member includes a flow path that guides, upward, air existing on the rear side of the fire wall,
 wherein the flow path is formed by the coupling member and a heat shielding member, and the heat shielding member being disposed to shield the coupling member from heat radiated by the fire wall,
 wherein the heat shielding member comprises a glass wool as a base material and a layer that reflects heat rays radiated from the fire wall,
 wherein the coupling member includes:
  a first flange facing the rear side of the fire wall and being covered with the heat shielding member,
  a second flange being jointed to the respective surfaces of the upper bulkhead and the lower bulkhead that face the fire wall, and
  a web coupling the first flange to the second flange and forming a flow path through which the air flows, between the web and the heat shielding member, and
 wherein the heat shielding member includes first and second parts, the first part extending along the first flange and the second part extending along the web.

9. A fuselage of an aircraft, comprising:
 an auxiliary power unit;
 a skin surrounding the auxiliary power unit;
 a fire wall dividing a compartment surrounded by the skin, into a first compartment and a second compartment, the first compartment housing the auxiliary power unit, and the second compartment not housing the auxiliary power unit;
 a structural member that faces the fire wall and is disposed in proximity to the first compartment, the structural member comprising an upper bulkhead and a lower bulkhead that are separate and distinct from one another; and
 a coupling member that couples the upper bulkhead to the lower bulkhead, the coupling member having first and second ends, the first end being disposed on a surface of the upper bulkhead that faces the fire wall and the second end being disposed on a surface of the lower bulkhead that faces the fire wall,
 wherein the structural member includes a flow path that guides, upward, air existing on a rear side of the fire wall,
 wherein the flow path is formed by the coupling member and a heat shielding member, and the heat shielding member being disposed to shield the coupling member from heat radiated by the fire wall,
 wherein the heat shielding member comprises a glass wool as a base material and a layer that reflects heat rays radiated from the fire wall,
 wherein the coupling member includes:
  a first flange facing the rear side of the fire wall and being covered with the heat shielding member,
  a second flange being jointed to the respective surfaces of the upper bulkhead and the lower bulkhead that face the fire wall, and
  a web coupling the first flange to the second flange and forming a flow path through which the air flows, between the web and the heat shielding member, and
 wherein the heat shielding member includes first and second parts, the first part extending along the first flange and the second part extending along the web.

10. The fuselage of the aircraft according to claim 9, further comprising an intake passage through which outside air is taken into an upper part of the second compartment, the intake passage being provided in the second compartment.

11. The fuselage of the aircraft according to claim 9, further comprising an exhaust passage through which air in the second compartment is exhausted, the exhaust passage being provided in the second compartment.

12. The fuselage of the aircraft according to claim 9, wherein the structural member is a pivot bulkhead.

* * * * *

UNITED STATES PATENT AND TRADEMARK OFFICE
CERTIFICATE OF CORRECTION

| | |
|---|---|
| PATENT NO. | : 11,286,030 B2 |
| APPLICATION NO. | : 15/431960 |
| DATED | : March 29, 2022 |
| INVENTOR(S) | : Nobuhide Hara |

It is certified that error appears in the above-identified patent and that said Letters Patent is hereby corrected as shown below:

In the Specification

Column 3, Line 27, "along line in" should read -- along line III-III in --.

Signed and Sealed this
Fifteenth Day of November, 2022

Katherine Kelly Vidal
*Director of the United States Patent and Trademark Office*